United States Patent
Joffe et al.

(10) Patent No.: US 6,625,142 B1
(45) Date of Patent: Sep. 23, 2003

(54) VOICE-MAIL APPLICATION ON THE ROUTER WITH NO SECONDARY STORAGE AVAILABLE

(75) Inventors: Neil Raymond Joffe, Palo Alto, CA (US); Ilya Umansky, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/312,204

(22) Filed: May 14, 1999

Related U.S. Application Data

(63) Continuation-in-part of application No. 09/272,811, filed on Mar. 19, 1999.

(51) Int. Cl.$^7$ .................... H04L 12/66; H04M 3/533
(52) U.S. Cl. .................. 370/356; 370/389; 370/401; 379/88.13; 379/88.17; 379/93.24; 709/203; 709/206
(58) Field of Search .................... 370/352, 354, 370/356, 389, 400, 401; 379/88.12, 88.13, 88.14, 88.17, 88.18, 88.25, 93.15, 93.24, 93.25; 709/201, 203, 206, 207, 218, 219, 249, 250

(56) References Cited

U.S. PATENT DOCUMENTS

| | | | |
|---|---|---|---|
| 4,918,722 A | 4/1990 | Duehren et al. | 379/100 |
| 5,291,546 A | 3/1994 | Giler et al. | 379/100 |
| 5,369,686 A | 11/1994 | Dutra et al. | 379/94 |
| 5,488,651 A | 1/1996 | Giler et al. | 379/100 |
| 5,712,907 A | 1/1998 | Wegner et al. | 379/112 |
| 5,767,985 A | 6/1998 | Yamamoto et al. | 358/402 |
| 5,812,278 A | 9/1998 | Toyoda et al. | 358/402 |
| 5,838,683 A | 11/1998 | Corley et al. | 370/408 |
| 6,138,036 A | * 10/2000 | OCinneide | 455/557 |
| 6,141,341 A | * 10/2000 | Jones et al. | 370/352 |
| 6,233,318 B1 | * 5/2001 | Picard et al. | 379/88.17 |
| 6,304,573 B1 | * 10/2001 | Hicks, III | 370/401 |
| 6,351,523 B1 | * 2/2002 | Detlef | 379/88.14 |
| 6,438,124 B1 | * 8/2002 | Wilkes et al. | 370/352 |

FOREIGN PATENT DOCUMENTS

| WO | WO 97/18665 | 5/1997 | H04N/1/100 |
|---|---|---|---|

\* cited by examiner

*Primary Examiner*—Alpus H. Hsu
(74) *Attorney, Agent, or Firm*—Law Offices of Imam

(57) ABSTRACT

In accordance with a method and apparatus of the present invention, a voice communication system is disclosed for use in a packet switching network environment including a host server for communicating voice information, initiated by a telephone user, to an electronic mail (email) recipient. A public switching telephone network (PSTN) includes at least one telephone device for communicating the voice information therethrough. The host server is responsive to email messages, transmitted in packet form, through the packet switching network The voice communication system includes a network device responsive to a voice message generated by the telephone user. The voice communication system is operative to convert the voice message to an email message, establish a first connection between the network device and the host server for transmission of the email message, edit the voice message pursuant to commands from the telephone user and transmit the email message, in the form of packets, to the host server for storage thereof and transmission thereafter to the email recipient, wherein the voice message may be manipulated by the telephone user prior to the transmission thereof by the network device without the use of secondary storage within the network device.

25 Claims, 3 Drawing Sheets

VOICE-MAIL APPLICATION ON THE ROUTER WITH NO SECONDARY STORAGE AVAILABLE

CROSS REFERENCE TO RELATED PATENT APPLICATIONS

This application is a continuation-in-part of our prior U.S. patent application Ser. No. 09/272,811, entitled "EMAIL To FAX Processing When No Secondary Storage Is Available", filed on Mar. 19, 1999, the co-inventors of which are Neil Joffe and Ilya Umansky.

BACKGROUND OF THE INVENTION

1. Field of the Invention

The present invention relates generally to the field of network communications systems employing routers for directing communication of voice-mail messages, in a packet switching network environment and particularly to routers having no secondary storage available for storing the voice-mail messages.

2. Description of the Prior Art

When a voice mail message is transmitted to a party over a telephone system, it is desirable for the party to be able to playback the message in order to edit or delete the same, if needed. In some present-day communications systems, telephone devices are generally connected to routers (or access servers) through the Public Service Telephone Network (PSTN). Within the router, a voice-mail message received from the telephone device, is converted to an electronic mail (email) message and later transmitted to its point of destination, which may be a Personal Computer (PC) or other types of communications devices capable of receiving email messages. To provide an efficient and less costly communications system, the email message is generally encoded or compressed within the router prior to transmission thereof.

To perform editing on a voice message at the time it is converted to an email message, the entire message must be stored in a secondary storage device such as a hard disk or nonvolatile memory. There are a number of reasons for the need to maintain storage of the entire message. Firstly, to edit a voice message, it is desirable to listen to and have access to the entire message. Moreover, if the user wishes to copy others on the message, the entire message must first be received and stored before it is distributed pursuant to the user's instructions. Secondly, even if it is possible to edit the message while only a portion of the message is received, it is nearly impossible to keep up with editing instructions while receiving the entire message. It is therefore necessary to maintain the message in a storage area.

Generally, however, routers lack secondary storage capability for various reasons, such as cost and size, and consequently cannot be used for the purpose of editing voice-related mail messages.

Therefore, the need arises for network communications systems using routers, or other network devices without secondary storage, to allow for editing, copying and other manipulation of voice-mail messages, which are converted to email messages within the network devices, and transmitted to the recipient.

SUMMARY OF THE INVENTION

Briefly, a voice communication system for use in a packet switching network environment, including a host server, for communicating voice information, initiated by a telephone user, to an electronic mail (email) recipient includes a network device. A public switching telephone network (PSTN) includes at least one telephone device for communicating the voice information therethrough. The host server is responsive to email messages, transmitted in packet form, through the packet switching network. The network device is responsive to a voice message generated by the telephone user and is operative to convert the voice message to an email message, establish a first connection between the network device and the host server for transmission of the email message, edit the voice message pursuant to commands from the telephone user and transmit the email message, in the form of packets, to the host server for storage thereof and transmission thereafter to the email recipient, wherein the voice message may be manipulated by the telephone user prior to the transmission thereof by the network device without the use of secondary storage within the network device.

The foregoing and other objects, features and advantages of the invention will be apparent from the following detailed description of the preferred embodiments which made reference to the several figures of the drawing.

IN THE DRAWING

DETAILED DESCRIPTION OF THE PREFERRED EMBODIMENTS

Figure 1:
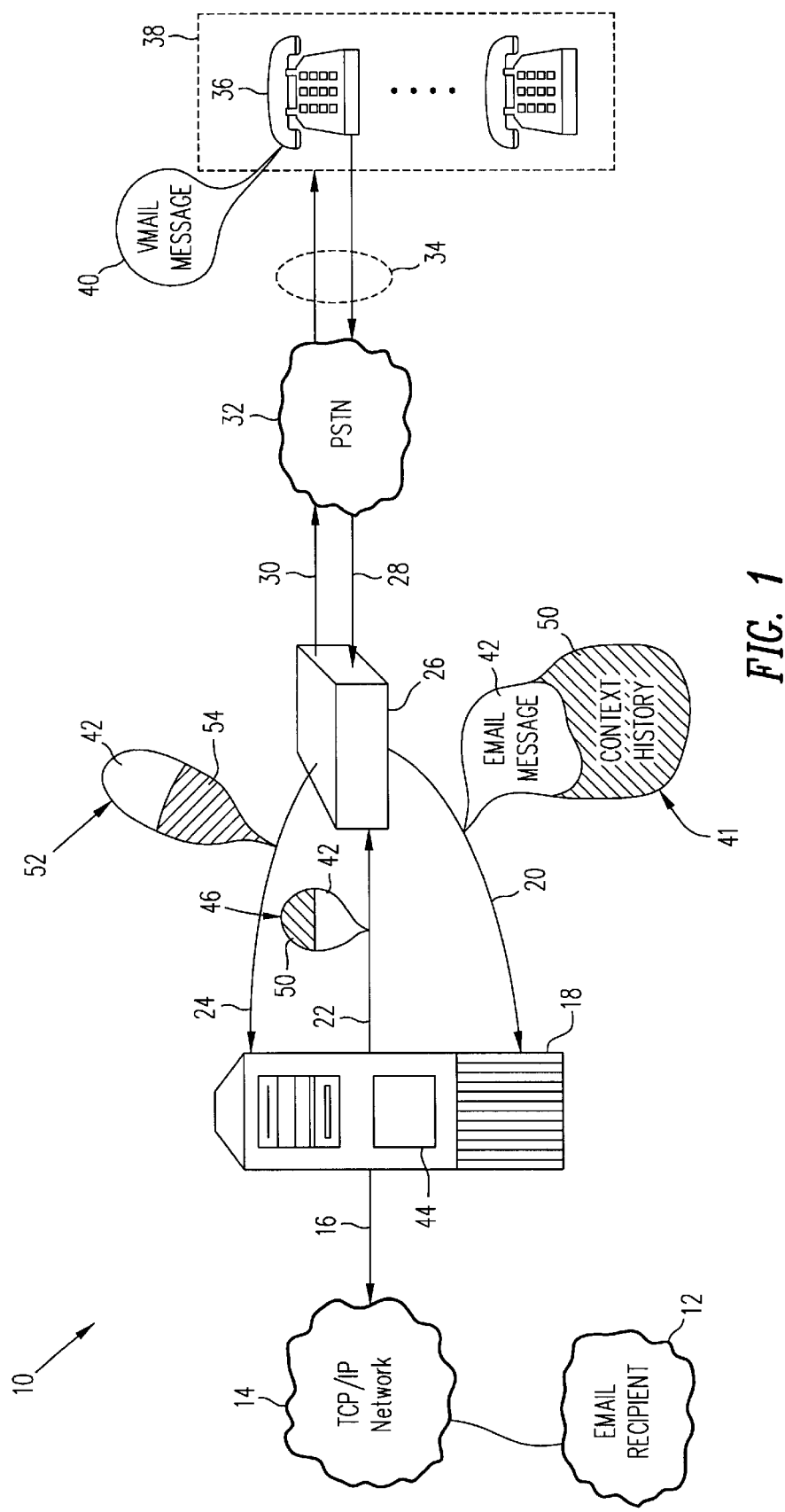
FIG. 1 shows a voice communication system 10 including a network device 26 in accordance with an embodiment of the present invention.

Referring now to FIG. 1, a voice communications system 10 is presented in accordance with an embodiment of the present invention. The voice communications system 10 is shown to include an electronic mail (email) recipient 12, a network 14, a host server 18, a network device 26, a public switching telephone network (PSTN) interface 32 and phone devices 38. The email recipient 12 is coupled through various paths, which will be discussed in detail in relation to the operation of the voice communications system 10. The network device 26 is coupled, through the PSTN 32, to the phone devices 38. In one embodiment of the present invention, the network device 26 may be an access server product including a router device for selecting a path that information should take through the packet switching network, such as the network 14 in FIG. 1, thereby requiring the router to have an understanding of the network and how to determine the best route for the path.

The email recipient 12 may be a Personal Computer (PC), a work station or alternatively, any other device capable of receiving email messages. The network 14 is generally an industry-recognized protocol, such as a Transmission Control Protocol/Internet Protocol (TCP/IP) and alternatively may use any other type of industry-recognized standard for communicating email messages between devices, such as the host server 18 an the email recipient 12. TCP/IP specifies certain protocol for use by manufacturers of equipment employed in the Internet environment. The host server 18 is a commercially-available device including storage space for storing email messages and directing the same to predetermined destinations based on the address included within the email message. The network device 26 may be an access server including a router device for receiving voice or email information and choosing the path to be taken by the information, which is generally in packet form, prior to reaching its final destination. The PSTN 32 is used by telephone companies for relaying voice information to and from telephone lines. The phone devices 38 include one or more telephone devices, such as a telephone device 36. Each of the phone devices 38 may be devices using dual tone modulation frequency (DTMF) for transmitting a voice message or may be voice-prompted where the user's voice initiates transmission of the voice message or may simply be a conventional dial pulse telephone.

Information between the phone devices 38 and the PSTN 32 is coupled through telephone company (telco) transmission lines 34 bidirectionally. In operation, a user of the telephone device 36 places a call to a predetermined destination defined by the telephone number dialed by the user. The call may be in the form of a voice mail (vmail) message 40 that may be stored and listened to by the recipient at a later time, at the recipient's leisure. With the advent of answering machines and voice mail boxes (storage areas for storing voice mail messages at an address defined by the telephone number of the voice mail message recipient), this is commonly done by the public-at-large. The vmail message 40, which is at this time in the form of a continuous stream of voice signal, is coupled, through the PSTN 32 and a network device input line 28, to the network device 26. The network device 26 converts the vmail message 40 into an email message 42, which is in packet form with each packet having a portion or packet of voice information for transmission thereof. The email message 42 is transmitted along with an email context history 50, to the host server 18. The email message 42 and the email context history 50 form an email package 41. In one embodiment of the present invention, the email context history is appended to the end of the email message 42.

The email context history includes information regarding the vmail message 40. For example, the context history may include commands or instructions, defined by the user of the telephone device 36 (the person leaving the vmail message) regarding actions to be taken on the vmail message 40. In FIG. 1, the user of the telephone device 36 may wish for the vmail message 40 to be distributed to a number of recipients, to be edited in a certain manner, to be played back to the user, to be fast-forwarded, to be recorded or delivered to the recipient at a later-specified time. There are indeed many instructions and commands that may be applied to a vmail message, which will be discussed in more detail shortly. The context information is commonly proprietary information to manufacturers of voice mail applications.

When the email message 42, which includes voice information, is sent to the host server 18, it is stored in an administrative account 44, identified by the address of the email message 42. The administrative account 44, sometimes referred to as a 'pop' account or a user account, occupies an area of nonvolatile memory, such as hard disk drive or the like, within the host server 18. The network device 26 does not include secondary storage for storing the entire email message. Thus, the present invention takes advantage of and uses the host server's memory for storage of the email message. In fact, as the user is transmitting the vmail message 40, i.e. the user speaks into one of the phone devices 38, there is a connection 20 established between the network device 26 and the host server 18 for transferring the email message 42 therebetween. The email message 42 is transmitted in packet form where each packet includes portions of the vmail message 40. As the user is transmitting the vmail message 40, the email message 42 is streamed out of the network device 26 to a particular administrative account 44 within the host server 18. Information coupled through the connection 20, in one embodiment of the present invention, may be governed by Simple Mail Transfer Protocol (SMTP). The network device 26 appends to the end of the email message 42, context history 50 and transmits both through the connection 20 to the host server 18.

If the user command is to discard the message, the connection 20 is simply disconnected. Alternatively, if the user command is to play back the message or if the user command is other than to discard the message, the context information is appended to the email message 42. The end of transmission of the email package 41 is noted by what is referred to as 'dot termination', which is the transmission of a dot or '.' from the network device 26 to the host server 18. In fact, every time an email package is transmitted between the host server and the network device, the end of the transmission is noted by 'dot termination'.

The context information, which may be in an industry-recognizable format, referred to as Multi-purpose Internet Mail Extensions (MIME), further includes information regarding which network device the user is connected thereto. In other words, in the voice communication system 10 of FIG. 1, there may be many devices within the phone devices 38 and while not shown in FIG. 1, there may additionally be many, network devices 26. Information regarding the connection of the phone devices to the network devices in included within the context information and appended to the email message 42 when the email message 42 is not discarded and coupled onto the connection 20 for storage within the administrative account 44. If the user command indicates that the message is ready to be transferred to its final destination, which may be the email recipient 12, then prior to such transfer and following the transfer of the vmail message's context history from the network device 26 to the host server 18, the terminating dot is transmitted indicating the end of the email message 42. The terminating dot is used by the recipient thereof, such as the host server 18 in this case, for indicating the end of the message and at such time, the connection that was established between the devices for transmitting the message may be disconnected.

Once the host server 18 receives the email message 42 and stores the same in the administrative user account, it invokes an executable file that is associated with the mail box or administrative user account. This executable file parses the context history of the message, which is located at the end of the message in one embodiment and moves the same in front of the email message 42 for transmission of an email package 46 including the email message 42 and the context history being in front of the email message to the network device 26. The email package 46 is then transmitted from the host server 18 back to the network device 26 through a connection 22, which may be an SMTP type of connection. It should be noted that the user continues recording while the message is transmitted through the connection 20 but the connection 22 is not established until the user somehow notes the end of the message and enters the next command or instruction. The user may note the end of the message by, for example, pressing the '#' key on the keypad of the telephone device, which would end the call. Thereafter, the connection 22 is established when the message is received by the host server 18 and stored within the administration account 44.

The network device 26 receives the email package 46 and uses the context history 50, which now appears in front of the email message 42 for obtaining all of the necessary information regarding the email message 42. For example, if the context history includes an instruction to play back the message, the email message 42 is converted back to the vmail message 40 and played back to the user by coupling the vmail message through the PSTN 32. This is, in part, the reason for including the context history in a location preceding the email message. That is, the network device 26 is given an opportunity to determine the destiny of the email message upon receipt thereof due to the contents of the context history.

Each reception of the email message by the network device 26, triggers sending of the email message 42 to the administrative account 44 in the host server 18 with the email message having appended thereto new context information each time it is re-transmitted to the host server 18. This process terminates when the user decides to finally finish editing the vmail message 40 and to have it sent to its final destination, which, for example, in FIG. 1, is the email recipient 12. The end of the message is identified by the user sending a predefined end-of-message command, such as a button on the telephone device 36 indicating 'sent'.

The context information in the last passage of the email message will include a "message sent" command and a destination and other relevant information. The telephone number that is dialed or otherwise indicated by the user generally identifies the destination. In FIG. 1, this passage is indicated by an email package 52 being sent through a connection 24, which may be an SMTP type of connection, from the network device 26 to the host server 18. The email package 52 includes a copy of the original message, or email message 42, and new context history 54, which includes the "message sent" command. The context information 54 is appended at the end of the email message 42 in the email package 52 that is transmitted to the host server 18 through the connection 24. In the host server 18, the email package is stored in the administrative account 44 and through the use of the executable file within the host server 18, it is determined from the contents of the context history 54 that the email message 42 is ready to be sent to its final destination. The host server 18 then sends the email message 42, through the network interface 14, to the email recipient 12. Alternatively: and while not shown in FIG. 1, the email message may be sent to more than one destination. Information regarding the number of destinations is also included in the context history. Upon the network device 26 sending the email message 42 in the last passage, it plays a proper prompt to the user of the telephone device 36 to indicate successful delivery of the vmail message 40. It should be noted that until the user sends a command indicating satisfaction with the message for transmission to the message's final destination, the email message is continuously looped between the network device and the host server. In fact, the message continues being transmitted to the host server 18 through the connection 24 for storage within the host server since secondary storage within the network device 26 does not exist. As previously stated, the vmail message 40 is too large to store within the network device 26.

In one embodiment of the present invention, all connections are "gracefully" terminated and in another embodiment of the present invention, if the user decides to discard the message, the router can terminate the connection through which the message is coupled "ungracefully". If the message is being coupled onto the connection 20, then the connection 20 is terminated "ungracefully" and if the message is being coupled onto the connection 24, then the connection 24 is terminated "ungracefully". "Ungraceful" termination of a connection is the same as "aborting" the connection, as discussed in more detail in the patent document referred to and incorporated by reference herein. In still another embodiment of the present invention, it is yet possible to "gracefully" terminate the connection even if the user commands to discard the message because the context information includes the user command to do the same.

Referring still to FIG. 1, as soon as the email package 46 begins to be received by the network device 26, the connection 24 is established.

Thus, when the email message 42 is transmitted from the network device 26 to the host server 18, sometimes referred to as the forward connection, i.e. connections 20 and 24 in FIG. 1, the context information is appended at the end of the email message and when the email message 42 is transmitted from the host server 18 to the network device 26, sometimes referred to as the reverse connection herein, it is placed in a position preceding the email message. Alternatively, context history may be stored in the network device 26.

In an alternative embodiment, the email message 42 that is coupled onto the connection 24 from the network device 26 to the host server 18 may not be identical to the email message 42 that is coupled onto the connection 20. This could be due to the user of the telephone device 36 having edited the message after listening to it. Consider the situation where the user speaks into the telephone device 36 and thereby creates the vmail message 40, which is ultimately transferred to the host server 18, in the form of an email message, through the connection 20. Thereafter, the email message is transmitted or played back to the network device 26 through the connection 22 where the network device 26 converts the email message back into the vmail message 40 and the user listens to what he/she has recorded and decides to modify it in some way. The modified or edited version of the vmail message 40 is then sent back to the network device 26, which, in turn, converts the latter into a modified email message that is now different than the original email message 42 sent by the user; This modified email message is then transmitted to the host server 18 by the network device 26.

In an alternative embodiment, the network device 26 sends the email message 42 and the context information 54 to a host server that is other than the host server 18. Stated differently, since the email message is in continuous transit and carries context information with it that identifies necessary information regarding the final destination and other like information, the email message 42 need not be transmitted to the same host server.

In FIG. 1, a router output line 30 is used for coupling voice information from the network device 26, through the PSTN. 32, to the phone devices 38. In one embodiment of the present invention, the network device input line 28 and the router output line 30 are T1 transmission lines carrying, 24 channels of voice information. Alternatively, they may be E1 or other like transmission lines.

Considering the example provided hereinabove regarding playing back the message to the user, the email message 42 is converted back to the vmail message 40 by the network device 26 and transmitted through the router output line 30 and through the PSTN to the phone devices 38.

Alternatively, in FIG. 1, the network interface 14 includes further host server devices such that when the host server 18 transmits the email message, the latter is received by yet another host server device. In fact, there may be a number of host server devices through which the email message travels within the network interface 14.

Figure 2:
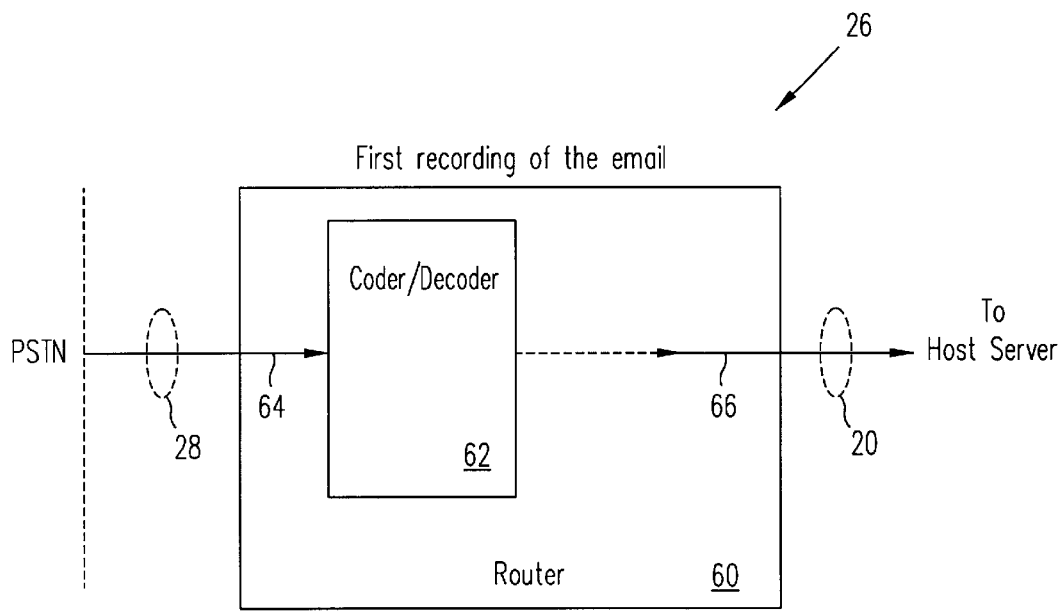
FIG. 2 illustrates more details of the networking device 26 of FIG. 1 in accordance with a preferred embodiment of the present invention.

FIG. 2 shows some details of the network device 26 in FIG. 1. In FIG. 2, the network device 26 is shown to include a router 60 coupled to the network device input line 28 and coupled to the router output line 20 for transmitting information to the host server 18. The router 60 includes a coder/decoder device 62, which receives a coder/decoder input 64 and generates a coder/decoder output 66. The input 64 is formed from the network device input line 28 and the output 66 forms the router output line 20.

Prior to transmission of the email message 42 (in FIG. 1) to the host server 18, the message is compressed by the coder/decoder device 62 to effectively reduce the size of the email message and minimize any redundancies inherently present therein. This results in an increase in the system throughput. In the play back example, prior to playing back of the message to the user on the line 30 and prior to conversion of the email message to vmail, the email message is decompressed by the coder/decoder 62 so as to reconstruct the original form of the message and then converted to vmail. The latter is shown more clearly in the following figure.

Figure 3:
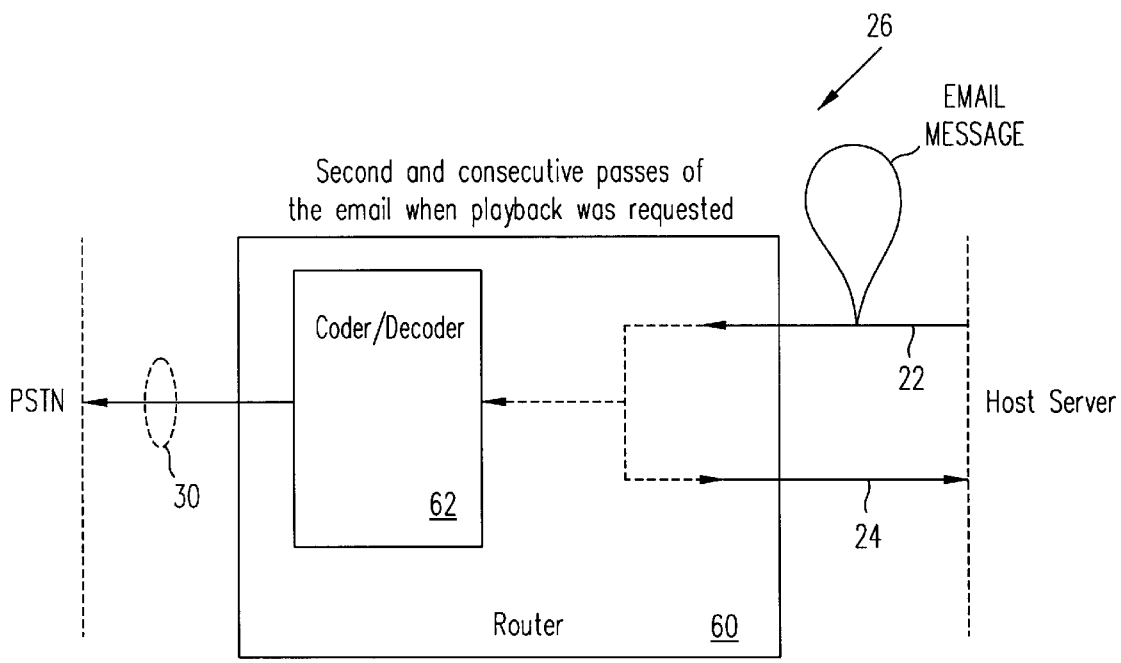
FIG. 3 shows details of the network device 26 with respect to second and further passes of the email message 42 shown in FIG. 1.

FIG. 3 shows details of the network device 26 with respect to second and further passes of the email message 42 shown in FIG. 1. In FIG. 3, the router 60 of FIG. 2 is shown to receive an email message, coupled onto the connection 22, from the host server 18. The received email message contains compressed voice information in the form of an email message, which is decompressed by the coder/decoder 62. The router 60 is also shown to transmit email information to the host server 18 through the connection 24. The transmitted email information is compressed prior to transmission by the coder/decoder 62. The router 60 is further shown to transmit or playback voice information to the user through the connection 30 and the PSTN 32. The played back voice information may be decompressed voice for Time Division Multiplexing (TDM) transmission. Alternatively, if the connection 30 couples the router 60 to a packet switching network (such as the Internet) rather than the PSTN 32, the played back voice information may be compressed in the same or different manner as done with respect to the information that is coupled onto the connections 22 and 24.

Figure 4:
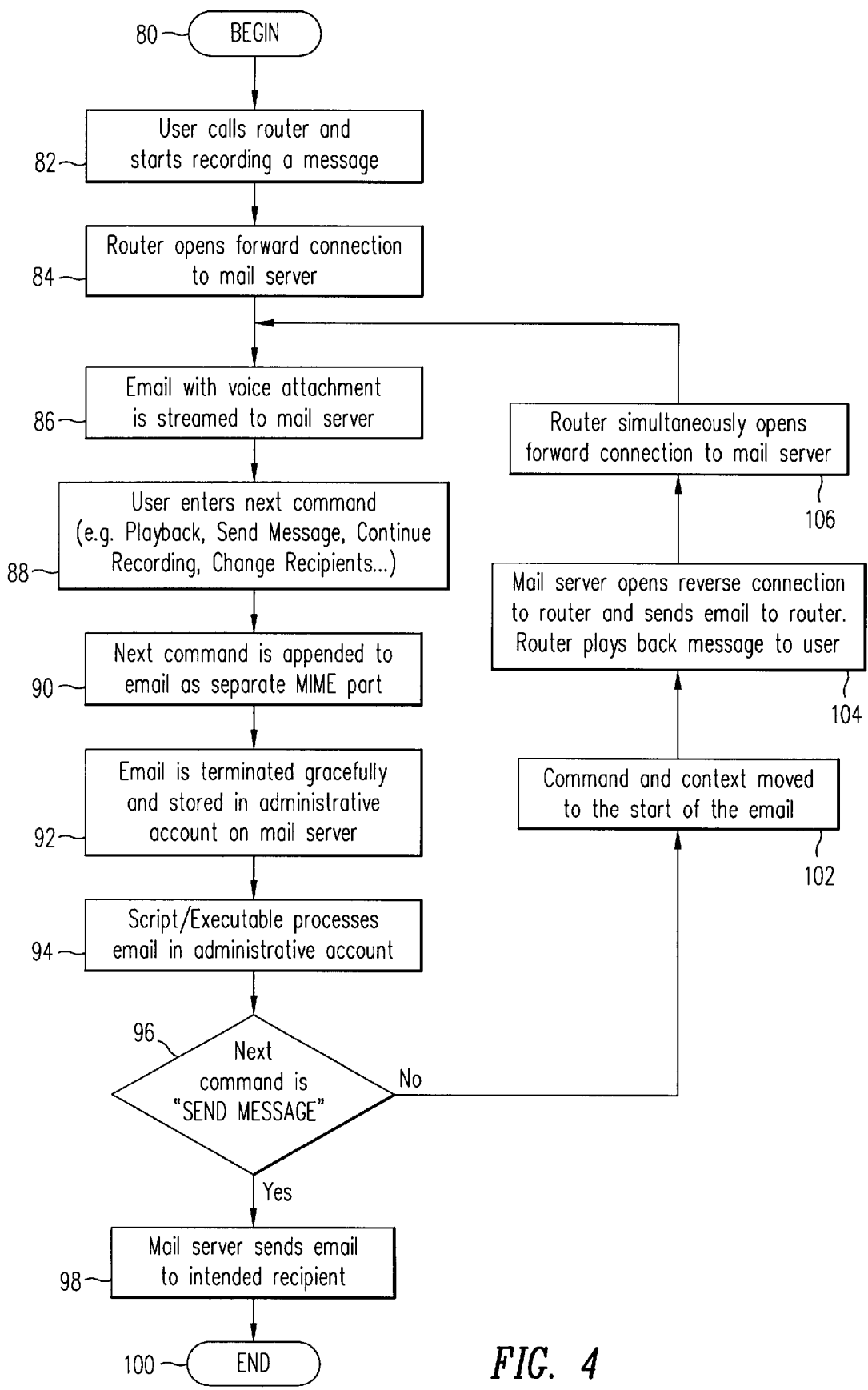
FIG. 4 shows, in flow chart form, the operation of the voice communication system 10 of FIG. 1.

In FIG. 4, the operation of the voice communication system 10 (in FIG. 1) is outlined in flow chart form. At 80, the operation begins and at step 82, the user places a call, which is transmitted to the network device 26 and the network device 26 starts recording the voice message provided by the user. As previously noted, the network device 26 is not capable of storing the entire voice message transmitted by the user and thus only stores a minimal amount or portions of the message prior to passing the portions onto the host server.

Following the step 82, at step 84, the network device establishes a forward connection, for example, the connection 20, to the host server 18. Thereafter, at step 86, the voice message from the user is converted to an email message, such as the email message 42 in FIG. 1 and the email message including context history is transmitted to the host server through the established connection.

At step 88, the user enters a command, which may be one of several commands, such as playback, send message, continue recording, change recipients and the like. A playback command causes the message to be played back to the user, as earlier discussed. A send message command causes the message to be sent to its final destination and essentially brings the message out of transit between the host server and the network device. The continue recording command causes the original voice message to include further voice information and the change recipients command causes modification of the originally-specified destination of the message.

The process continues to step 90 after step 88 at which time the command that was entered by the user at step 88 is appended to the email message 42 as a part of the context history. Thereafter, at step 92, the forward connection established at step 84 and that was used to transfer the email message to the host server 18 is 'gracefully' terminated and the email message is stored in an administrative user account within the host server 18. An explanation of how a connection is 'gracefully' terminated and how a connection is 'aborted' is provided in a related U.S. patent application Ser. No. 09/272,811, entitled "EMAIL To FAX Processing When No Secondary Storage Is Available", filed on Mar. 19, 1999, the inventors of which are Neil Joffe and Ilya Umansky and the disclosure of which is incorporated herein by reference as though set forth in full.

Following step 92, step 94 is performed at which time the executable file in the host server 18 causes the processing of the email message that is stored within the user account. Next, at 96, a determination is made as to whether or not the next command entered by the user is a 'send message' command. If so, step 98 follows and the host server 18 sends the email message to the intended recipient, such as the email recipient 12 in FIG. 1 and the process ends at 100.

On the other hand, if the determination at 96 yields no 'send message' by the user, the process continues to step 102 at which time the context history, such as the context history 50, is moved to the front or start of the email message. As the reader recalls, the context history includes the next command specified by the user at 96. Thereafter, at step 104, the host server establishes a reverse connection, for example the connection 22 in FIG. 1, for coupling the email message to the network device 26. The network device 26, upon receipt of the email message, converts the same to a vmail message and starts to play back the latter to the user by coupling the vmail message onto the line 30. At step 106, at the same time the network device 26 starts to play back the message at step 104, it establishes a forward connection (from the network device 26 to the host server 18), such as the connection 24 in FIG. 1, for re-transmitting the email message along with potentially different context information to the host server. As previously discussed, the mail message that is sent back through for example the connection 24 may be different in contents from that of the email message originally sent to the host interface, for example, the latter being the connection 20. In fact, the user may continue to edit the message resulting in a modified email message being transferred back to the host server every time. Additionally, the email message may be sent back and forth between the network device and the host server many times until the user is satisfied with the message and so indicates by sending a 'send message' command. This is shown in FIG. 4 by the process continuing onto the step 86 after the step 106 whereat the email message is sent back to the host server and the steps 86–106 continue to be performed until the result of the determination at 96 is positive with respect to receiving a 'send message' command.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What we claim is:

1. A voice communication system for use in a packet switching network environment, the environment including a host server for communicating voice information, initiated by a telephone user, to an electronic mail (email) recipient, a public switching telephone network (PSTN) coupled to at least one telephone device and through which the voice information is communicated to the host server, the host server being responsive to email messages, transmitted in packet form, which include the voice information, the system comprising:

a network device responsive, through the PSTN, to a voice message generated by the telephone user and operative to convert the voice message to an email message, establish a first connection to the host server for transmission of the email message, edit the voice message pursuant to commands from the telephone user and transmit the email message, in the form of packets, to the host server, as the voice message is being received, for storage thereof and transmission thereafter to the email recipient, wherein the need for a secondary storage within the network device for storing the email message in its entirety is eliminated while allowing manipulation of the voice mail by the telephone user.

2. A voice communication system as recited in claim 1 wherein the network device is further operative to append context history to the email message to form a first email package and transit the email package through the first connection to the email recipient.

3. A voice communication system as recited in claim 2 wherein the context history is moved to the front of the email message to form a second email package for transmission thereof from the host server to the network device.

4. A voice communication system as recited in claim 2 wherein the context history includes commands identified by the telephone user.

5. A voice communication system as recited in claim 3 further including a second connection between the host server and the network device for coupling the second email package therebetween.

6. A voice communication system as recited in claim 5 wherein the network device is further responsive to the second email package through the second connection and further operative to parse the email message from the second email package and convert the same back to the voice message for editing by the telephone user.

7. A voice communication system as recited in claim 6 wherein the network device is responsive to to a modified voice message from the telephone user and is operative to convert the modified voice message to a modified email message, append further context history to the modified email message to form a modified email package, establish a third connection between the network device and the host server for transmission of the modified email message to the host server.

8. A voice communication system as recited in claim 6 wherein the network device is further operative to receive a command from the telephone user indicating playback of the voice message, playback the voice message to the telephone user and await further commands from the telephone user to be performed on the voice message.

9. A voice communication system as recited in claim 7 wherein the first, second and third connections are terminated each time after transmission of an email package through the first, second and third connections, respectively.

10. A voice communication system as recited in claim 7 wherein the first, second and third connections are used for coupling information in the form of packets in accordance to SMTP.

11. A voice communication system as recited in claim 7 wherein the network device is coupled to the at least one of the telephone devices through PSTN.

12. A voice communication system as recited in claim 7 wherein the host server is coupled to the email recipient through TCP/IP network.

13. A voice communication system as recited in claim 12 wherein the TCP/IP network includes further host servers.

14. A voice communication system as recited in claim 6 wherein the network device is further operative to receive a command from the telephone user indicating to discard the voice message whereupon the network device is operative to discard the voice message.

15. A voice communication system as recited in claim 1 wherein the network device is an access server.

16. A voice communication system as recited in claim 15 wherein the access server includes a router device responsive to the voice message for conversion thereof to the email message.

17. A voice communication, system as recited in claim 16 wherein the router device includes a coder/decoder device for compressing the voice message prior to conversion thereof to the email message and prior to transmission thereof to the host server and for decompressing the voice message prior to transmission thereof to the telephone user.

18. A method for communicating voice information for use in a voice communication system within a packet switching network environment to an electronic mail (email) recipient, the system including at least one telephone device for communicating the voice information initiated by a telephone user, through a public switching telephone network and further including a host server responsive to email messages, transmitted in packet form, through the packet switching network, the method comprising:

receiving a voice message by a network device, the voice message being generated by the telephone user;

converting the received voice message to an email message;

continuing to receive the voice message;

receiving commands from the telephone user for editing the received voice message;

editing the received voice message based upon the received commands;

establishing a first connection between the network device and the host server for transmission of the email message;

streaming the email message, in the form of packets, out of the network device, for transmission to the host server as the voice message is being received; and causing storage of the streamed email message within the host server for later transmission of the stored email message to the email recipient.

19. A method for communicating voice information as recited in claim 18 further including the steps of appending context history to the email message to form a first email package and transmitting the email package through the first connection to the email recipient.

20. A method for communicating voice information as recited in claim 19 further including the step of moving the context history to the front of the email message to form a second email package for transmission thereof between the host server and the network device.

21. A method for communicating voice information as recited in claim 20 further including the step of establishing a second connection between the host server and the network device for coupling the second email package therebetween.

22. A method for communicating voice information as recited in claim 21 further including the steps of receiving the second email package through the second connection, parsing the email message from the second email package and converting the same back to the voice message for editing by the telephone user.

23. A method for communicating voice information as recited in claim 22 further including the step of receiving a modified voice message from the telephone user, converting the modified voice message to a modified email message, appending further context history to the modified email message to form a modified email package and establishing a third connection between the network device and the host server for transmission of the modified email message to the host server.

24. A method for communicating voice information as recited in claim 22 further including the step of receiving a command from the telephone user for indicating playback of the voice message, playing back the voice message to the telephone user and awaiting further commands from the telephone user to be performed on the voice message.

25. A method for communicating voice information as recited in claim 23 further including the steps of terminating the first, second and third connections each time after transmitting an email package through the first, second and third connections, respectively.

* * * * *